Oct. 27, 1959     K. C. GALLAGHER     2,909,864

ARTIFICIAL LURES

Filed May 2, 1956

INVENTOR.
KENNETH C. GALLAGHER
BY
ATTORNEY

2,909,864
ARTIFICIAL LURES

Kenneth C. Gallagher, Detroit, Mich.

Application May 2, 1956, Serial No. 582,143

3 Claims. (Cl. 43—42.48)

This invention relates to improvements in artificial lures, and in particular to artificial lures especially formed to provide improved diving and darting qualities.

The primary object of the invention is to provide an artificial lure in the form of a small fish or minnow so constructed as to create an improved vigorous combined darting-diving action when reeled-in after having been cast.

A further object of the invention is to provide an improved diving artificial lure which permits the fisherman to regulate its dive action so that the lure may be readily adapted at the election of the fisherman to one having a relatively deep combined diving and darting action rather than its normal diving and darting action, thus accomplishing a dual purpose with a single lure.

Other objects of the invention will become apparent by reference to the following detailed description taken in connection with the accompanying drawing, in which.

Figure 1:
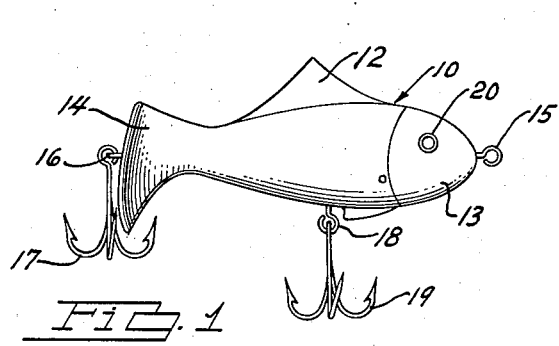
Fig. 1 is a side elevational view of an artificial lure embodying the invention with the lure facing to the right as shown in the drawing.
Figure 2:
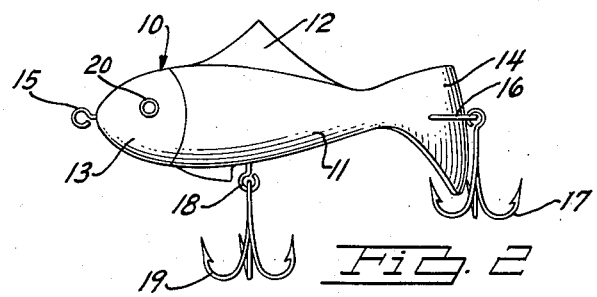
Fig. 2 is a side elevational view similar to Fig. 1 showing the opposite side of the artificial lure.
Figures 3, 4:
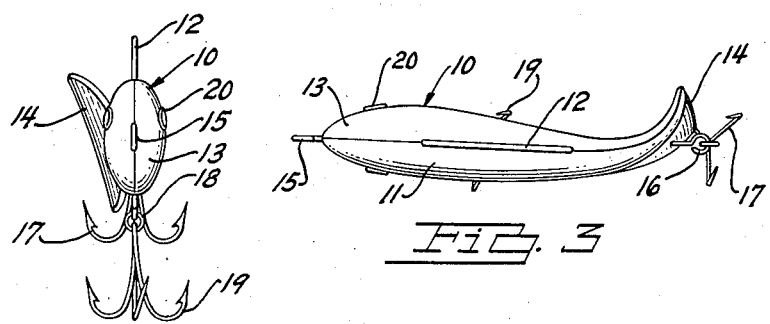
Fig. 3 is a top view of the lure disclosed in Figs. 1 and 2.
Fig. 4 is a front elevational view.
Figure 5:
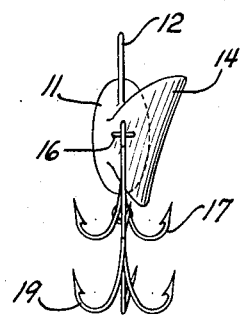
Fig. 5 is a rear elevational view.

Referring now to the drawings wherein like numerals refer to like and corresponding parts throughout the several views, the artificial lure 10 disclosed to illustrate the invention comprises a body portion 11 preferably formed to imitate a small fish or minnow having a dorsal fin 12, a head 13 and a laterally curved and downwardly twisted tail 14 providing an off-center scoop which imparts a combined darting and diving action when the lure 10 is reeled-in intermittently after casting into the water. An eyelet 15 extends forwardly from the head 13 of the lure 10 to which a fish line (not shown) may be secured. Another eyelet 16 extends rearwardly from the curved and twisted tail 14 and has a tail hook 17 connected thereon. A third eyelet 18 extends downwardly from the body 11 and has a belly hook 19 connected thereon. Both the tail hook 17 and the belly hook 19 are preferably treble hooks and are of such weight and so located that the artificial lure 10 will ride substantially horizontally in line with the pull of the fish line when drawn very slowly and at an even rate of speed through the water.

Figure 6:
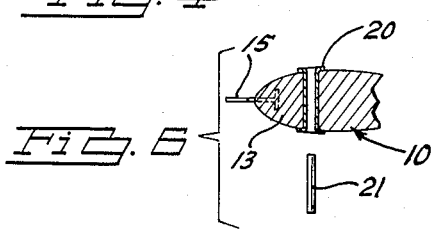
Fig. 6 is an exploded fragmentary horizontal sectional view through a preferred form of eye construction showing means employed for balancing the lure for relatively deep diving and darting action.

A hollow rivet 20 preferably of brass or aluminum is pressed laterally through the head 13 of the lure 10 to serve aesthetically as eyes therefor. To alter the dive action of the lure 10, the floating balance thereof is changed by the insertion of a cylindrical plug 21 of lead or the like as illustrated in Fig. 6 into the central aperture of the said hollow rivet 20. It is preferable that the said plug 21 fit snugly into the said central aperture of the hollow rivet 20 thereby causing it to retain itself in the head 13 of the said lure 10. The artificial lure 10 without the balance weight 21 is preferably of such buoyancy that it will sink very slowly and substantially horizontally. With the balance weight or plug 21 positioned in the aperture of the hollow rivet eye of the artificial lure 10, the said lure will sink somewhat more rapidly, but not fast, and with the head thereof pointed downwardly at a relatively flat angle from horizontal.

In fishing with an artificial lure embodying the invention, the lure 10 is attached to the end of a fishing line, and is cast to the desired area to be fished. If the water is relatively shallow, the lure is used unweighted, and, when reeled-in alternately fast and slow at short intervals to give it a jerking or chugging action, the lure will dart and dive near the surface of the water. If the fishing is being done in relatively deep water, the fisherman will press the cylindrical weight plug 21 laterally into the hollow rivet 20 forming the eye of the lure, and, after casting the lure to the desired area, the lure will slowly sink. As soon as the lure sinks to a short distance above the depth at which fishing is preferable, the lure is reeled in alternately fast and slow at short intervals to give it a jerking or chugging action whereupon the lure will dart and dive at the desired underwater level. If, however, it is desired to sink the weighted lure more rapidly than its buoyancy permits, it may be reeled-in very slowly and very smoothly as it sinks after having been cast to the area to be fished.

Of importance in the instant invention is the curved and downwardly twisted tail 14. It should be noted that the tail 14 is relatively large, and, in manufacture it is formed into a curve to one side of the longitudinal axis of the lure body and is formed with a downwardly twist about the longitudinal axis of the lure, which combined curve and twist provides a water scoop that kicks the tail diagonally upwardly when the lure is reeled-in after casting, and thereby directs the lure diagonally laterally and diagonally downwardly when reeled-in alternately fast and slow with a jerking or chugging action. This form of lure is not only novel and unique, but it provides an improved fishing action which is highly desirable and sought by most fishermen.

Although but a single object of the invention has been disclosed herein together with a single modification thereof, it is obvious that many changes may be made in the size, shape, arrangement and detail of the various elements thereof without departing from the spirit and scope of the invention as defined by the appended claims.

I claim:

1. In an artificial lure in the form of a small fish, a substantially straight vertically disposed generally oval body including a head and a dorsal fin, an offset downwardly twisted tail, the said tail having a single laterally and downwardly disposed twist therein providing an off-center scoop, an eyelet extending forwardly from said head through which a fish line may be secured, an eyelet extending downwardly from the belly of said lure including fish hook means thereon, and an eyelet extending rearwardly from said twisted tail generally in axial alignment with said body but forward of the end of said tail and including fish hook means thereon.

2. In an artificial lure in the form of a small fish, a substantially straight vertically disposed generally oval body including a head and a dorsal fin, an offset downwardly twisted tail, an eyelet extending forwardly from said head through which a fish line may be secured, eyelets extending from said tail and the belly of said body, fish hook means engaged in said last two mentioned eyelets, the said tail having a single laterally and downwardly disposed twist therein providing an off-center scoop to impart a combined darting and diving action in the water upon intermittent reeling-in of said lure after casting, the said head of said lure having an aperture therein located between said head eyelet and said belly eyelet, and weight means disposable in said aperture balancing said lure on a relatively flat longitudinal downward angle when in the water to provide a greater than normal diving action upon said intermittent reeling-in.

3. In an artificial lure in the form of a small fish, a substantially straight vertically disposed generally oval body including a head and a dorsal fin, an offset downwardly twisted tail, the said tail having a single laterally and downwardly disposed twist therein providing an off-center scoop creating a dart-dive action when said lure is drawn intermittently through the water, an eyelet extending forwardly from said head through which a fish line may be secured, an eyelet extending downwardly from the belly of said lure including fish hook means thereon, an eyelet extending rearwardly from said twisted tail generally in axial alignment with said body but forward of the end of said tail and including fish hook means thereon, a hollow rivet extending laterally through the said head rearwardly of said fish line securement eyelet, and weight means frictionally insertable in the shank of said hollow rivet changing the balance of said lure forwardly when in the water whereby to increase the said diving of the said dart-dive action when said lure is drawn intermittently through the water.

References Cited in the file of this patent

UNITED STATES PATENTS

| | | |
|---|---|---|
| 681,308 | Geen | Aug. 27, 1901 |
| 1,368,939 | Kelley | Feb. 15, 1921 |
| 1,739,258 | Quin | Dec. 10, 1929 |
| 1,972,697 | Walsh | Sept. 4, 1934 |
| 2,538,484 | Tenn | Jan. 16, 1951 |
| 2,745,207 | Akkanen | May 15, 1956 |
| 2,763,087 | Schnitzer | Sept. 18, 1956 |